United States Patent
Tseng et al.

(10) Patent No.: US 8,135,874 B2
(45) Date of Patent: Mar. 13, 2012

(54) AUTOMATIC MAPPING AND UPDATING COMPUTER SWITCHING DEVICE

(75) Inventors: Jung-Wei Tseng, Taipei (TW); Cheng-Sheng Chou, Taipei (TW); Hung-June Wu, Taipei (TW)

(73) Assignee: June-On Technology Co., Ltd., New Taipei (TW)

( * ) Notice: Subject to any disclaimer, the term of this patent is extended or adjusted under 35 U.S.C. 154(b) by 236 days.

(21) Appl. No.: 12/060,879

(22) Filed: Apr. 2, 2008

(65) Prior Publication Data

US 2009/0254682 A1    Oct. 8, 2009

(51) Int. Cl.
*G06F 3/00*    (2006.01)
(52) U.S. Cl. .......................................................... 710/11
(58) Field of Classification Search ...................... 710/11
See application file for complete search history.

(56) References Cited

U.S. PATENT DOCUMENTS

| | | | |
|---|---|---|---|
| 6,012,103 A * | 1/2000 | Sartore et al. ...................... 710/8 |
| 6,324,605 B1 * | 11/2001 | Rafferty et al. ............... 710/100 |
| 6,549,966 B1 * | 4/2003 | Dickens et al. ............... 710/300 |
| 6,636,929 B1 * | 10/2003 | Frantz et al. ................... 710/313 |
| 7,054,983 B2 * | 5/2006 | Mizokuchi et al. ........... 710/305 |
| 7,472,217 B2 * | 12/2008 | Lou et al. ....................... 710/316 |
| 2005/0273312 A1 * | 12/2005 | Sandulescu et al. ............ 703/25 |
| 2007/0300216 A1 * | 12/2007 | Miyagi .......................... 717/168 |

OTHER PUBLICATIONS

USB Complete 3$^{rd}$ Edition by Jan Axelson Copyright 1999-2005.*

* cited by examiner

*Primary Examiner* — Henry Tsai
*Assistant Examiner* — Eric Oberly
(74) *Attorney, Agent, or Firm* — Bacon & Thomas, PLLC

(57) ABSTRACT

The present invention relates to an automatic mapping and updating computer switch device. The computer switching device provides the compatibility between a plurality of devices and a plurality of computers, and comprises a USB host chip connected to the plurality of peripheral devices each containing a USB connector for sending the necessary data (USB device descriptor/report) to a plurality of USB device chips, thus, the computers can acquire the necessary data of the peripheral devices through the connected USB device chips. Whenever the computer switching device re-boots or any of the peripheral devices are plugged in/pulled out, the USB host chip reads the new necessary data again with the previous ones, if any differences are found, the new necessary data is send to the USB device chips for storage. The aforesaid procedure is called DDM (Dynamic Devices Mapping) or full USB Enumeration or full USB Initiation.

5 Claims, 3 Drawing Sheets

AUTOMATIC MAPPING AND UPDATING COMPUTER SWITCHING DEVICE

BACKGROUND OF THE INVENTION

1. Field of the Invention

The present invention relates an automatic mapping and updating computer switching device, particularly, the computer switching device ensures the compatibility between a plurality of peripheral devices and a plurality of computers.

2. Description of the Related Art

When a computer fails to meet the operational requirement, adding a new computer or continuing to use the obsolete machine is the most considered practice. But under the situations of limited space or budgets, these ideas often never come true. However, following to the rapid development of electronic information technology, two or more computer, whether new or old, can share one keyboard, mouse, monitor and even one speaker, microphone and any other peripheral devices simply through connecting in series to a computer switch (KVM). In this way, the user can not only gain more work space for improving work efficiency, but also save the money to purchase the peripheral devices.

The so-called computer switch (KVM) is a keyboard, video and mouse switch, in other words, it allows the user to switch among multiple computers at the same time by means of one keyboard, video and mouse set. The computer switch not only simplifies the operational equipment under multi-computer environment, but also allows the user to synchronously manage the different computers or servers through rapid switching from one computer to another, without interruption of the operation of the computer when the switching is performed and making the operation easier.

However, since a regular USB-type computer switch available on the market is impossibly applied to all type of USB devices, the regular USB-type computer switch often leads to incompatibility of the multi-function mouse, keyboard, joystick, touch screen or other USB human interface device (HID) with the computers or connection problems. The devices enumeration, descriptors report analysis or other structural configuration of the regular USB-type computer switch are stimulated and converted to a established computer interface format, therefore, it cannot satisfy all USB devices. Additionally, the connection of the regular computer switch to the USB devices other than mouse and keyboard usually requires a USB hub. Therefore, when the above problem occurs, besides replacement with the compatible USB devices, a new control program version (with added stimulation and conversion functions) may be adopted as the solution for some computer switches. But the two methods cannot resolve the incompatibility problem completely.

Therefore, it is desirable to provide an automatic mapping and updating computer switching device that eliminates the aforesaid problems.

SUMMARY OF THE INVENTION

The present invention has been accomplished under the circumstances in view. It is therefore one object of the present invention to provide an automatic mapping and updating computer switching device which comprises a USB host chip connected to a plurality of peripheral device each containing a USB connector. The USB host chip can read the necessary data of the peripheral devices, or monitors and records the necessary data (USB device descriptor/report) while the necessary data of the peripheral devices are transmitted to the computers by a USB switch chip via a USB hub chip in order to gain and store the report analysis, enumeration, category, configuration or other necessary data of the peripheral devices, then these necessary data is sent to a plurality of USB device chips for storage. Such that, when the computers communicate with the connected USB device chips, the USB device chips send the stored necessary data to the computers and enable the peripheral devices to perform the operations to the computers, and further, the computability between the peripheral devices and the computers is guaranteed.

We can call this feature is DDM (Dynamic Device Mapping) or True Full USB Device Enumeration Simultaneously to all connected Systems and keep it alive.

According to another aspect of the present invention, when the computer switching device re-boots and any of the peripheral devices is plugged in or pulled out, the USB host chip will read and store the new necessary data (USB device descriptor/report) of the peripheral devices, and compares the it with the previous stored ones, and then, if any differences are found, the USB host chip will update the new necessary data to the USB device chips so that the connected computers can know the necessary data relating to the peripheral devices and the peripheral devices are compatible with the connected computers. (We can call this procedure USB Device Full Initiation).

DETAILED DESCRIPTION OF THE PREFERRED EMBODIMENT

Figure 1:
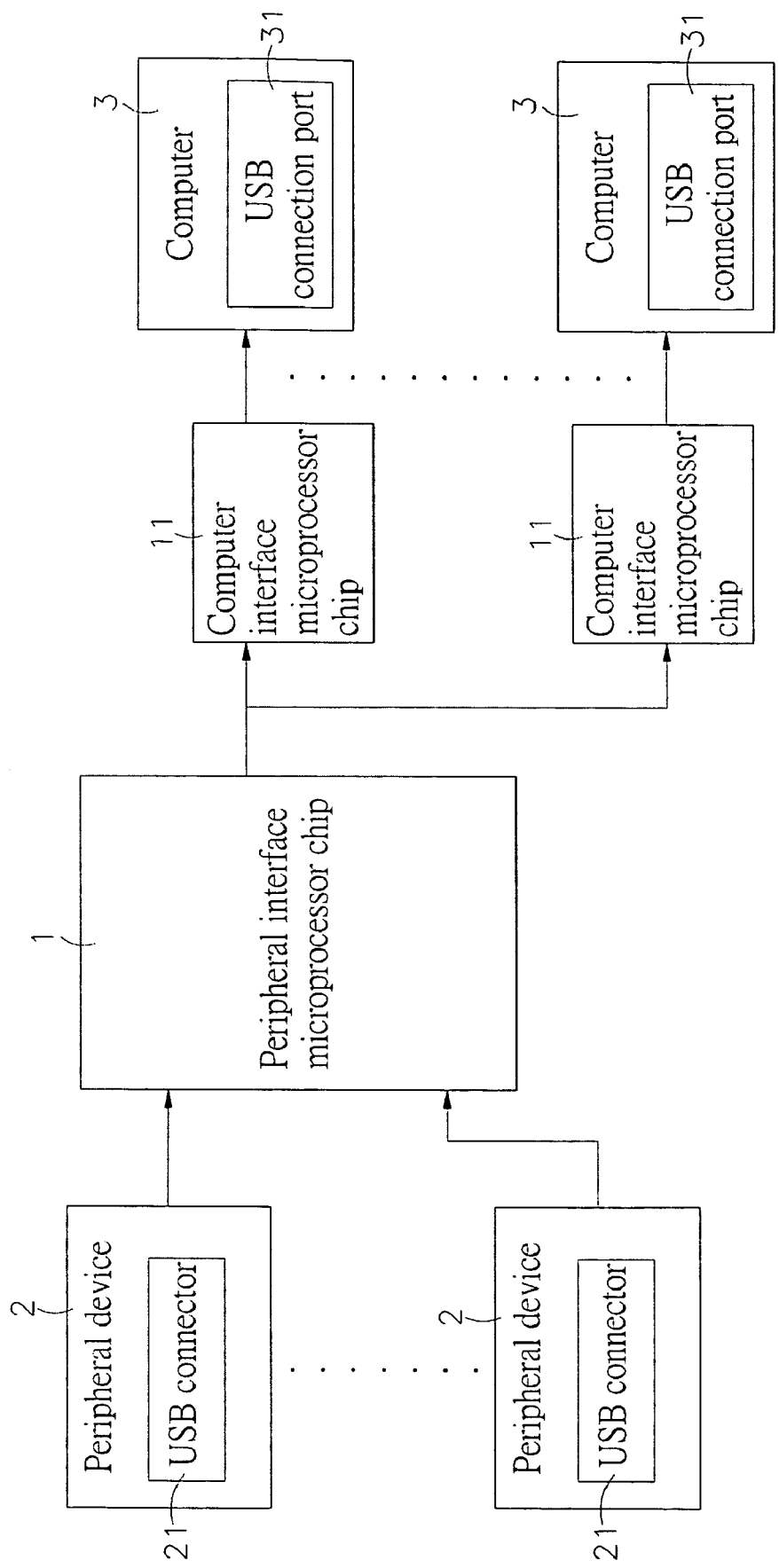
FIG. 1 is a block diagram of a computer switching device in accordance with the present invention.

Referring to FIG. 1, an automatic mapping and updating computer switching device in accordance with the present invention is shown comprised of a USB host chip 1. The USB host chip 1 is provided for connecting with a plurality of peripheral devices 2 each containing a USB connector 21 and a plurality of USB device chips 11. The USB device chips 11 are further connected to a plurality of computers 3 each having a USB connection port 31.

When in use, the USB host chip 1 is stimulated as a host and fully communicates with the peripheral devices 2 connected to the computer switching device based on the standard USB communication protocol to read and store the report analysis, enumeration, category, configuration or other necessary data of the peripheral devices 2, and then these necessary data is transmitted to the USB device chips 11 for storage. Such that, the computers 3 can acquire the accurate data of the peripheral devices 2 through the USB device chips 11 and enable the peripheral devices 2 to perform the operations. Therefore, it likes that the computers 3 and the peripheral devices 2 are connected together directly, without problem of incompatibility occurred in the peripheral devices 2 with different categories, types or functions of (such as mouse, keyboard, joystick, touch screen, hub or other device with USB connection interface).

If the computer switching device re-boots or any peripheral device 2 is plugged in or pulled out, the USB host chip 1 will communicate with the peripheral devices 2 based on the standard USB communication protocol for reading and storing the necessary data again, and compare the new data with the old ones; if no differences are found, it will not update the USB device chips 11, on the contrary, if any differences are found, it will map the new data into the USB device chips 11 to update the connected computers 3. Thus, the computers 3 can know the data of the peripheral devices 2 currently connected to the USB host chip 1. In the case that the USB device chips 11 are not connected to the computers 3 or the computers 3 are not started, after connecting or starting, the USB device chips 11 will update the data of the peripheral devices 2 into the computers 3 and enable the peripheral devices 2 to perform the operations, without the problem of incompatibility.

Figure 2:
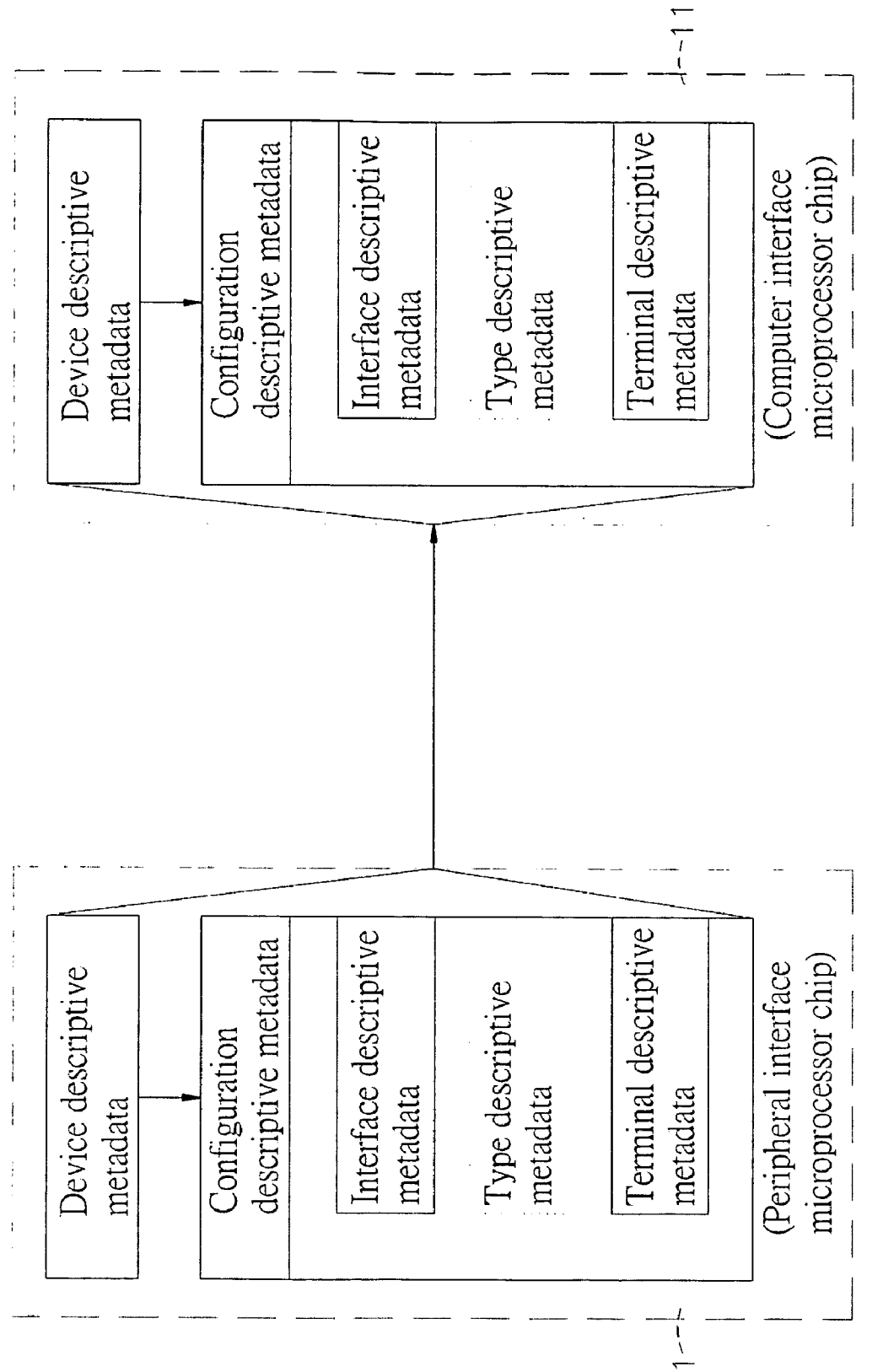
FIG. 2 is a data transmission block diagram of the computer switching device in accordance with the present invention.

Referring to FIG. 2, the necessary data of the peripheral devices 21 read by the USB host chip 1 are sent to the USB device chips 11 through internal data transmission lines. The necessary data is device descriptive metadata containing configuration descriptive metadata, interface descriptive metadata, type descriptive metadata and terminal descriptive metadata.

Figure 3:
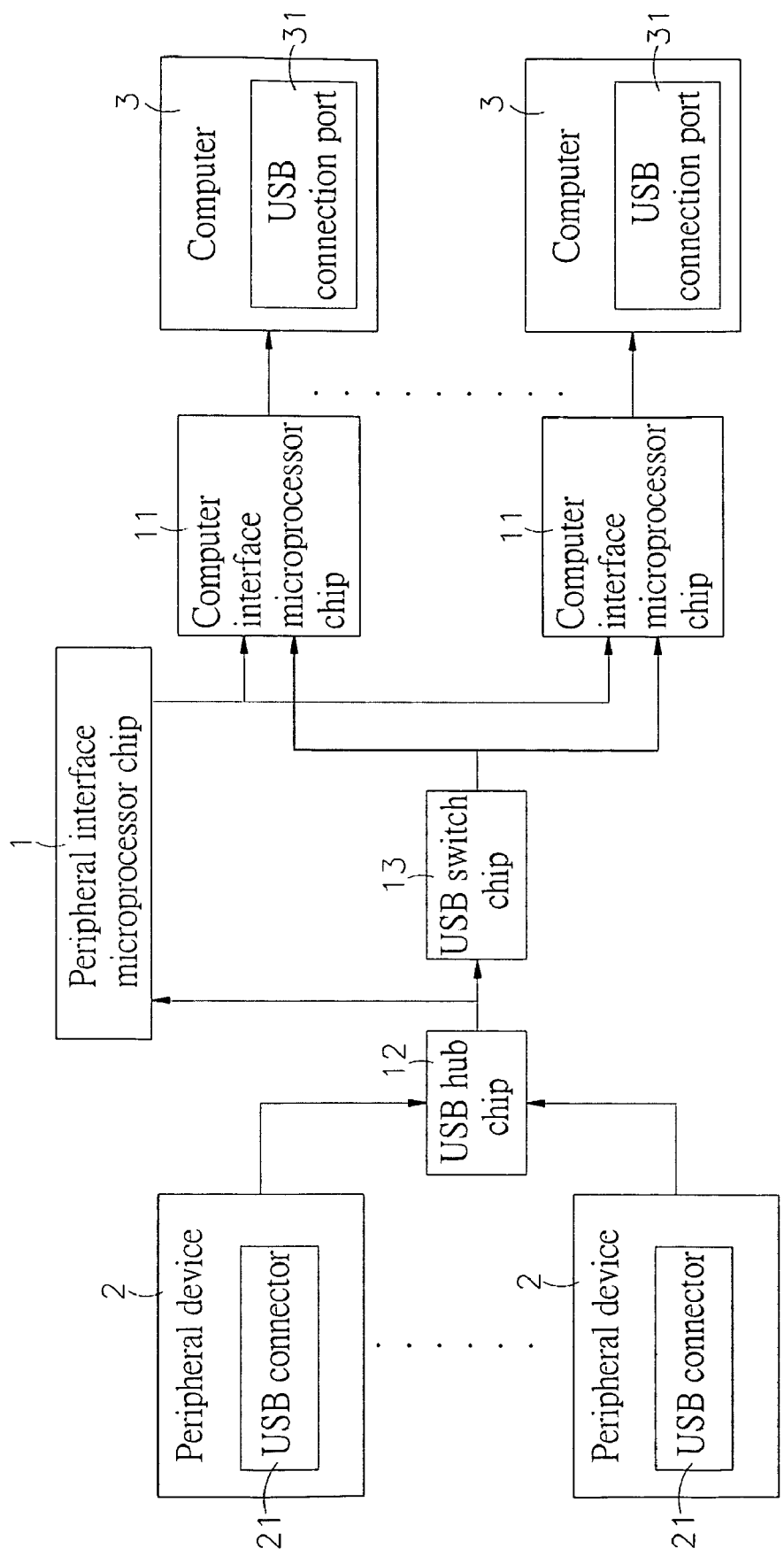
FIG. 3 is a block diagram of the computer switching device in accordance with another embodiment of the present invention.

FIG. 3 is a block diagram in accordance with another embodiment of the present invention. The embodiment is substantially similar to the aforesaid embodiment with the exception of a USB hub chip 12 and a USB switch chip 13. The USB hub chip 12 is connected with the peripheral devices 2. Besides, the USB hub chip 12 is further electrically connected to the USB host chip 1 and the USB switch chip 13. The USB switch chip 13 is further connected to the USB device chips 11.

When the computer switching device is connected to the peripheral devices 2 and the computers 3, first, allow one of the computers 3 be directly connected to the peripheral devices 2 for data transmission, at this time, the data of the peripheral devices 2 are transmitted through the USB hub chip 12 to the USB switch chip 13 and further to a pre-determined USB device chips 11 so that the computer 3 connected with the pre-determined USB device chips 11 could perform the operations to the peripheral devices 2. Meanwhile, the USB host chip 1 will carry out monitoring and recording to obtain and store the report analysis, enumeration, category, configuration or other necessary data of the peripheral devices 2. Then, these necessary data of the peripheral devices 2 are transmitted to other USB device chips 11 for storage via the data transmission lines. Hereafter, after the USB device chips 11 are connected to the computers 3, the USB device chips 11 will transmit the stored necessary data of the peripheral devices 2 to the connected computers 3 to ensure each of the computers 3 stores the same necessary data of the peripheral devices 2, achieving the objective that the peripheral devices 2 can perform the operations to the plurality of computers successfully.

The USB host chip 1 and the plurality of USB device chips 11 can be not only installed on a circuit board inside the computer switching device but also constructed inside a semiconductor chip to form an Application Specific Integrated Circuit (ASIC) or a commercial application integrated circuit to reduce the size and for easy assembly.

Along with the popularization of USB devices, like mobile disks, external hard drives, music players, mobile phones, mice, keyboards and other electronic devices with USB connection ports, a plurality of USB devices connected with the computer switching device can be inserted and removed frequently due to the plug-and-play characteristics. The USB host chip 1 of the present invention can read and store the report analysis, enumeration, category, configuration or other necessary data of the peripheral devices 2, and then transmits these the necessary data to the USB device chips 11 for storage, which are correspondingly connected to the computers 3 one to one, so that the computers 3 can receive the same necessary data regarding the peripheral devices 2. Thus, the problem of incompatibility resulted from the insertion or removal of the peripheral devices 2 can be avoided and the convenience in use of the computer switching device is improved, preventing the computers 3 from breakdown, errors or other faults raising out of incompatibility of the peripheral devices 2, and enhancing people's desire to use the computer switching device.

The computer switching device may be a switch, a extender or a distributor, provided that it has the function of connecting the peripheral devices 2 and the computers 3.

In actual practice, the automatic mapping and updating computer switching device of the present invention has the following features and advantages:

1. The USB host chip 1 can directly read the report analysis, enumeration, category, configuration or other necessary data of the peripheral devices 2 with the USB connectors 21, or monitor and record the transmission of these necessary data by the USB hub chip 12 to the computers 3 via the USB switch chip 13 to acquire and store the necessary data of the peripheral devices 2, and then transmits these necessary data to the USB device chips 11. Such that, each computer 3 can obtain the correct data regarding the peripheral devices 2 from the USB device chips 11, and enable the peripheral devices 2 compatible with the plurality of computers 3 to perform the operation successfully.

2. When the computer switching device re-boots or any peripheral device 2 is plugged in or pulled out, the USB host chip 1 will read and store the necessary data of the peripheral devices 2 again, and compares the new data with the previously stored ones; if any differences are found, the USB host chip 1 will map the new data into the USB device chips 11 for updating so that the computers 3 can always got the latest necessary data of the peripheral devices 2 through the USB device chips 11. Thus, the peripheral devices 2 can be compatible with the computers 3 after plugging in/pulling out and updating.

In general, the invention provides an automatic mapping and updating computer switching device, which uses a USB host chip 1 to read and store necessary data of a plurality of peripheral devices 2 with USB connectors 21, and sends the necessary data to a plurality of USB device chips 11 so that each of a plurality of computers 3 can read the necessary data of the peripheral devices 2 from the USB device chips 11. Therefore, the peripheral devices 2 are really compatible with the computers 3.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An automatic mapping and updating computer switching device for automatic executing enumeration between a plurality of peripheral devices and a plurality of computers, comprising:
   a USB host chip electrically connected to said peripheral devices; and
   a plurality of USB device chips electrically connected between said USB host chip and said computers;
   wherein, in a standard USB procedure for standard USB devices which are connected as peripheral devices, which is performed when said computer switching device is turned on, said USB host chip acts as a computer to receive the enumeration command/data from the peripheral device and stores the enumeration command/data in a USB host chip memory, and said USB host chip transfers the enumeration command/data to said USB device chip and said USB device chip stores the transferred enumeration command/data in a USB device chip memory, and said USB device chip acts as a peripheral device to transfer the enumeration command/data to the computer, so that the peripheral device is enumerated by the USB host chip as a standard USB device, wherein all the enumeration command/data in the above procedure are recorded in said USB host chip and said USB device chip, wherein, in a comparison procedure, where the enumeration command/data of the previously connected peripheral device is stored, as an old enumeration command/data, in the USB host chip memory, and the enumeration command/data of a plugged/unplugged peripheral device is as a new enumeration command/data, and the comparison procedure is performed when said automatic mapping and updating computer switching device re-boots and when any of said peripheral devices is plugged/unplugged, the USB host chip performs the comparison of the old stored enumeration command/data with the new enumeration command/data, and if the result of the comparison is the same, the USB host chip performs nothing, or if there is any difference therebetween, the USB host chip performs the standard USB procedure for each peripheral device, wherein all of the respective enumeration command/data for each of the peripheral devices enumerated as a standard USB device in the previous procedures are transferred by the USB host chip to all of the USB device chips.

2. The automatic mapping and updating computer switching device as claimed in claim 1, wherein said USB host chip makes complete communication with said peripheral devices based on the standard USB communication protocol after said USB host chip has been stimulated as a host.

3. The automatic mapping and updating computer switching device as claimed in claim 1, wherein said enumeration data include configuration descriptive metadata, interface descriptive metadata, type descriptive metadata and terminal descriptive metadata.

4. An automatic mapping and updating computer switching device for automatic executing enumeration between a plurality of peripheral devices and a plurality of computers, comprising:

a USB host chip, a plurality of USB device chips, a USB hub chip and a USB switch chip, wherein, said USB hub chip is electrically connected to said peripheral devices to individually receive enumeration command/data for each of said peripheral devices, said USB hub chip transmits the enumeration command/data to said USB switch chip and said USB host chip;

said USB switch chip for selecting USB device chips is electrically connected between said USB hub chip and said USB device chips for sending the received enumeration command/data from the USB hub chip to a selected USB device chip of said USB device chips;

said USB host chip is electrically connected between said USB hub chip and said USB device chips, and said USB device chips are respectively electrically connected to one of the plurality of computers that is individually connected therewith, wherein, in a standard USB procedure for standard USB device which are connected as peripheral devices, which is performed when said computer switching device is turned on, said USB host chip acts as a computer to monitor and receive the enumeration command/data from the USB hub chip to the switch chip and stores the enumeration command/data in a USB host chip memory, and the USB switch chip transfers the enumeration command/data to the selected USB device chip and the selected USB device chip stores the transferred enumeration command/data in a USB device chip memory, and said USB device chip acts as a peripheral device to transfer the enumeration command/data to the computer so that the peripheral device is enumerated by the USB host chip as a standard USB device, wherein all the enumeration command/data in the above procedure are recorded both in said USB host chip and said selected USB device chip, and then said USB host chip transfers all the enumeration command/data recorded therein to the other USB device chips which are not selected by said USB switch chip, wherein, in a comparison procedure, where the enumeration command/data of the previously connected peripheral device is stored, as an old enumeration command/data, in the USB host chip memory, and the enumeration command/data of a plugged/unplugged peripheral device is as a new enumeration command/data, and the comparison procedure is performed when said automatic mapping and updating computer switching device re-boots and when any of said peripheral devices is plugged/unplugged, the USB host chip performs the comparison of the old stored enumeration command/data with the new enumeration command/data, and if the result of the comparison is the same, the USB host chip performs nothing, or if there is any difference therebetween the USB host chip performs the standard USB procedure for each peripheral device.

5. The automatic mapping and updating computer switching device as claimed in claim 4, wherein said enumeration data include configuration descriptive metadata, interface descriptive metadata, type descriptive metadata and terminal descriptive metadata.

* * * * *